E. HUSON.
Wagon.
No. 2,500.
Reissued Mar. 5, 1867.
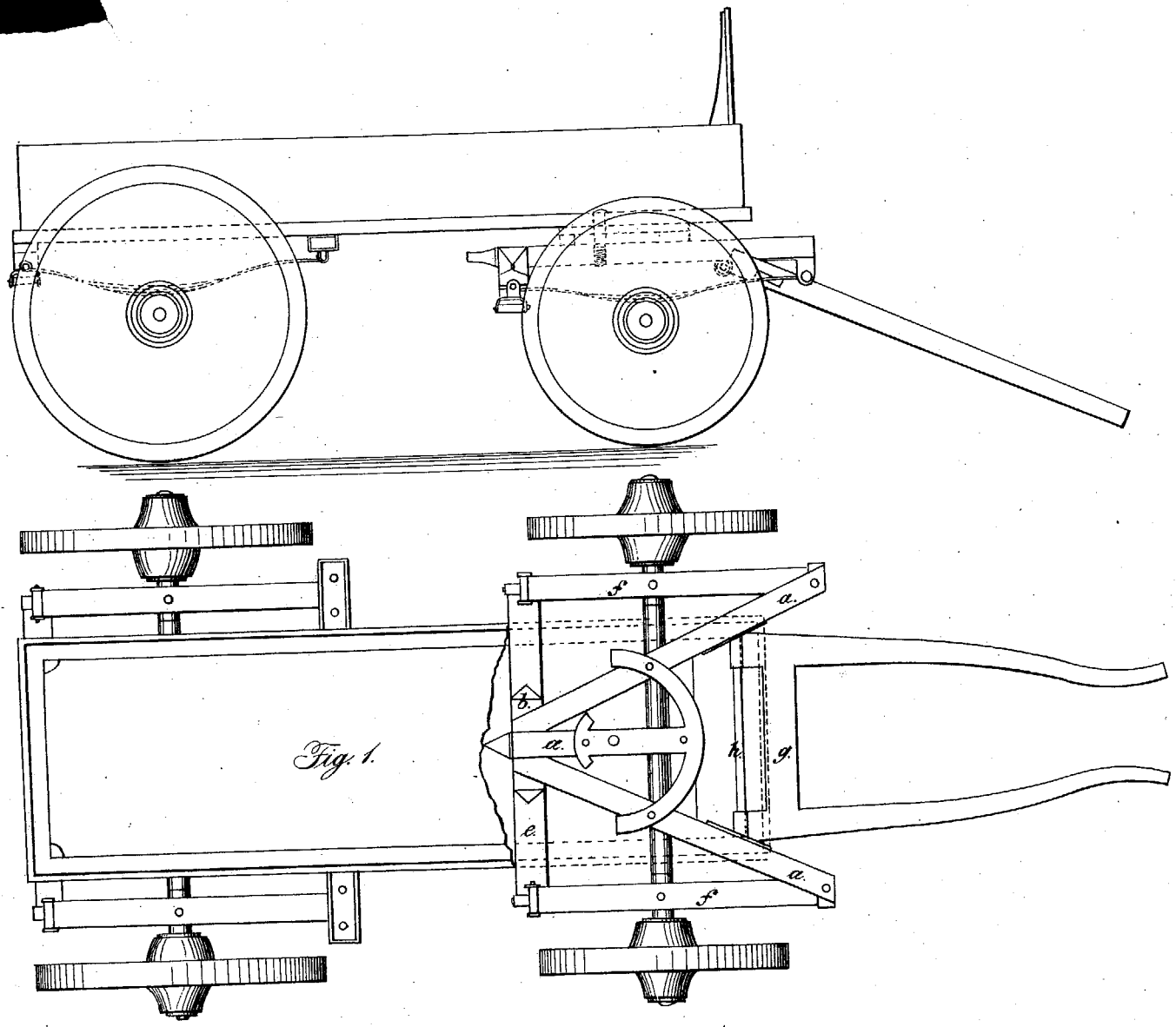
AM. PHOTO-LITHO. CO. N.Y. (OSBORNE'S PROCESS.)

UNITED STATES PATENT OFFICE.

EDGAR HUSON, OF ITHACA, NEW YORK.

IMPROVEMENT IN WAGONS.

Specification forming part of Letters Patent No. 16,648, dated February 17, 1857; reissue No. 2,500, dated March 5, 1867.

*To all whom it may concern:*

Be it known that I, EDGAR HUSON, of Ithaca, Tompkins county, New York, have invented an Improved Platform Wagon-Gearing; and I do hereby declare that the following is a full and exact description thereof, reference being had to the annexed drawings, and letters of reference marked thereon.

The object of my invention is to make a stronger, lighter, and better device or structure for wagons and other vehicles, using several flat springs over or about the front axle, thus rendering it necessary to connect the springs with the king or pivot bolt by a platform or frame-work. This I accomplish mainly by the use of two or more bars having a longitudinal direction to the wagon, and more or less parallel to the side springs, and so as to bear on the forward ends of the said springs, either directly or by an intermediate part or parts. These bars I call side splinter-bars; and making the ends just named thus fast I extend the bars backward to and secure them to the head-block on the rear or transverse spring. I also effect, when desirable, another object. By the arrangement described the cross-bar of the thills or pole can be admitted between the ends of the splinter-bars a little back of their ends, thus making the wagon more compact. And, lastly, by using the rear or cross bar of the thills or pole as a tie-bar or support to the forward ends of the splinter-bars and springs, I bind the platform more strongly together, and give a greater freedom to its action. This is seen in the drawings, where—

Figure 1 is a view looking down on my platform or frame, and Fig. 2 a side view.

In Fig. 1, *a a* are two straight splinter-bars, extending from the forward ends of the springs *f f* to the head-block *b*, which is attached to the transverse spring *e*, thus somewhat A-shaped. This exact shape and position of my splinter-bars and platform or frame is not essential to my invention, as the splinter-bars can be curved more or less, or three, four, or more in number, or be used more parallel with the springs, and more or less so to each other; or the splinter-bars may meet and touch each other on the head-block, or be separated widely apart, or be separated from the ends of the springs at their forward ends; or the middle splinter-bar *d* be extended to or near the front ends of the springs *f f;* or that bar may be made of two or more pieces, to hold the pole, or two or more transverse cross-bars be used, curved, waved, circular, or other shaped; and other variations may be made in the structure of my platform, and yet my invention be the same in them all. The letter *d* points out the middle splinter-bar, and *c c* the two transverse or cross bars, so arranged in the drawing that, though of unequal diameters, they are segments of the resting-circle or fifth-wheel. In Fig. 2 side views of the same parts are seen.

By attaching the thills, as shown, in rear of the forward ends of the side springs, back on the side splinter-bars, I bring the horse or team nearer the vehicle, and make the wagon more compact; and also use the cross-bar of the thills or rear bar of the pole to act as a bar, stay, or holding tie or beam to the ends of the splinter-bars and springs, through the hinges on the end of the said bar, and thereby secure greater strength and freedom to the front end of the platform or frame.

The application of my device to various vehicles is apparent to those skilled in the art to which it appertains.

I claim as my invention—

1. The use of two or more side splinter-bars, when they extend from any convenient point at or near the forward ends of the side springs to the head-block, and the use of the said splinter-bars, whether attached directly to the forward ends of the said side springs, or by any convenient means intervening between them, as described.

2. Fastening the pole or thills to the side splinter-bars, or other convenient part of the platform or frame, at or near or in rear of the ends of the side springs, as described.

3. So making the frame or platform as to leave the extremities of it open, so as to receive the pole or thills between and back of the forward ends of the side springs, thus bringing the team or horse nearer the wagon, thereby lessening the draft, and requiring less room in which to turn.

EDGAR HUSON.

Witnesses:

SAMUEL J. PARKER,
JOHN GAUNTLETT.